United States Patent [19]
Duke et al.

[11] 4,128,883
[45] Dec. 5, 1978

[54] SHARED BUSY MEANS IN A COMMON BUS ENVIRONMENT

[75] Inventors: Jack R. Duke, San Marcos; Niranjan S. Shah, Escondido; William C. Woolf, San Diego, all of Calif.

[73] Assignee: NCR Corporation, Dayton, Ohio

[21] Appl. No.: 838,280

[22] Filed: Sep. 30, 1977

[51] Int. Cl.² ............................................. G06F 3/04
[52] U.S. Cl. ................................................ 364/200
[58] Field of Search ... 364/200 MS File, 900 MS File; 179/15 BA, 15 BY, 15 AL; 340/147 LP, 147 SY, 147 C, 147 CV, 147 CN, 147 G

*Primary Examiner*—James D. Thomas
*Attorney, Agent, or Firm*—J. T. Cavender; Stephen F. Jewett; Edward Dugas

[57] ABSTRACT

A data processing system includes a plurality of data handling subsystems which communicate with each other by means of an interval transfer bus. The subsystems are located at ports along the bus and each is provided with a local bus adapter interconnecting the subsystem with the bus. Busy lines are provided, one for each port on the bus, and all such busy lines are connected to all of the ports for use by any such port when the latter is acting as a source. Each busy line is uniquely connected to an individual one of the ports and is employed at such individual port to signal to all other ports the busy or available state of the individual port. A subsystem, acting as a source, inspects the busy line that is unique to the selected destination, and if availability of the selected destination subsystem is indicated by the state of its busy line, a request for access is issued by the source, and if granted, the source raises the distination busy line to busy state, and transmits its message.

To enable two subsystems to share a common port and a common busy line without modification of other subsystems that use the internal transfer bus, a pair of shared local bus adapters is provided at a single port, each shared adapter being uniquely connected to a respective one of the two subsystems at such port. The shared local adapters are connected with each other so that the common busy line of the port is employed by the two to signal that either or both of the shared adapters are busy or are available. Each shared adapter that is not busy tests an incoming message to determine whether the message is for itself or for the other of the pair of shared adapters. The results of this test in one of a pair of the shared adapters is employed together with an indication of the busy status of the other of the pair to provide a temporary busy signal that is fed back to the source via a code on existing status lines.

8 Claims, 7 Drawing Figures

SHARED BUSY MEANS IN A COMMON BUS ENVIRONMENT

CROSS REFERENCE TO RELATED APPLICATION

The present invention is an improvement on the system described in an application entitled "High Speed Destination Selection Means For A Bus Oriented Computer System" filed on Nov. 19, 1975, by Jack R. Duke et al, Ser. No. 633,345 now U.S. Pat. No. 4,038,644 and assigned to the assignee of the present application. The disclosure of such earlier filed application Ser. No. 633,345 is incorporated herein by this reference just as though fully set forth herein.

BACKGROUND OF THE INVENTION

In a data handling system of the type described in the above-identified patent application, a common bus architecture is employed in which an internal transfer bus having a number of ports has a local bus adapter at each port for connecting the bus to the subsystem at such port. The bus includes a number of busy lines, generally one for each port, with all such busy lines being connected to the adapters at all such ports. Each port, or more specifically its adapter, has one of the busy lines uniquely assigned thereto, which busy line is operable for certain purposes when the port is operating as a destination. The busy line, when referred to in connection with its unique port, may be termed a "destination" busy line for such port. The busy lines are also utilized when the subsystems or adapters thereof are acting as sources and when so used, the busy lines may be termed "source" busy lines. Thus each busy line is a destination line for a single port, but a source busy line for all other ports. The busy line is employed to indicate to all other adapters on the bus availability of the adapter to receive a message. In addition, the busy line is used by the source to signal a selected adapter to take a message from the common bus.

Although each busy line is uniquely assigned (as a destination busy line) to a single port and thus to a single adapter and a single subsystem at such port, it is often desirable to add additional subsystems. Such applications would make it desirable for the receiver to determine if the message is for it. However, only a single busy line is normally assigned as a destination busy line to a single port and the systems are thus limited. Therefore, addition of another subsystem in communication with an internal transfer bus ostensibly would require another busy line. To increase the number of busy lines would require complex, difficult and costly modification of the system.

Accordingly it is an object of the present invention to enable two or more subsystems to share a single busy line.

SUMMARY OF THE INVENTION

In carrying out principles of the present invention in accordance with a preferred embodiment thereof, a group of data handling subsystems communicate with one another by means of an internal transfer bus having a number of bus ports connected to the subsystems by local bus adapters, each bus port having a single busy line uniquely assigned thereto for signalling busy or available states of the adapter at such bus port and for signalling an incoming message from one of the other adapters. The system includes first and second shared local bus adapter means for respectively connecting first and second ones of the subsystems in common to one of said ports such that the single busy line is a common busy line connected and assigned to both of the shared adapter means of the one port for signalling busy and available states thereof. The shared adapter means comprises means for employing the common busy line to signal to other subsystems a busy or available state of both of the shared subsystems and also includes means responsive to a communication addressed to one of the subsystems of a shared pair for signalling to the source subsystem on the bus that the selected one is busy while the other is not.

The effective use of a single common busy line by two or more subsystems has many applications and basically provides an expanded system capability, employing additional data handling subsystems, in a modular operation that requires a minimum of modification of other subsystems and of basic system architecture. The many uses of the described invention include the use of the added subsystem as a dynamic backup in a redundant operation, such as for example, a pair of redundant interbus communication cables connected in common to a single port of an internal transfer bus, and the use of added subsystems for expanded and improved memory interleaving.

BRIEF DESCRIPTION OF THE DRAWINGS

FIG. 4, comprising FIGS. 4A and 4B, is a logic block diagram of portions of the pair of shared local bus adapters of FIG. 1.

DETAILED DESCRIPTION OF THE INVENTION

Figure 1:
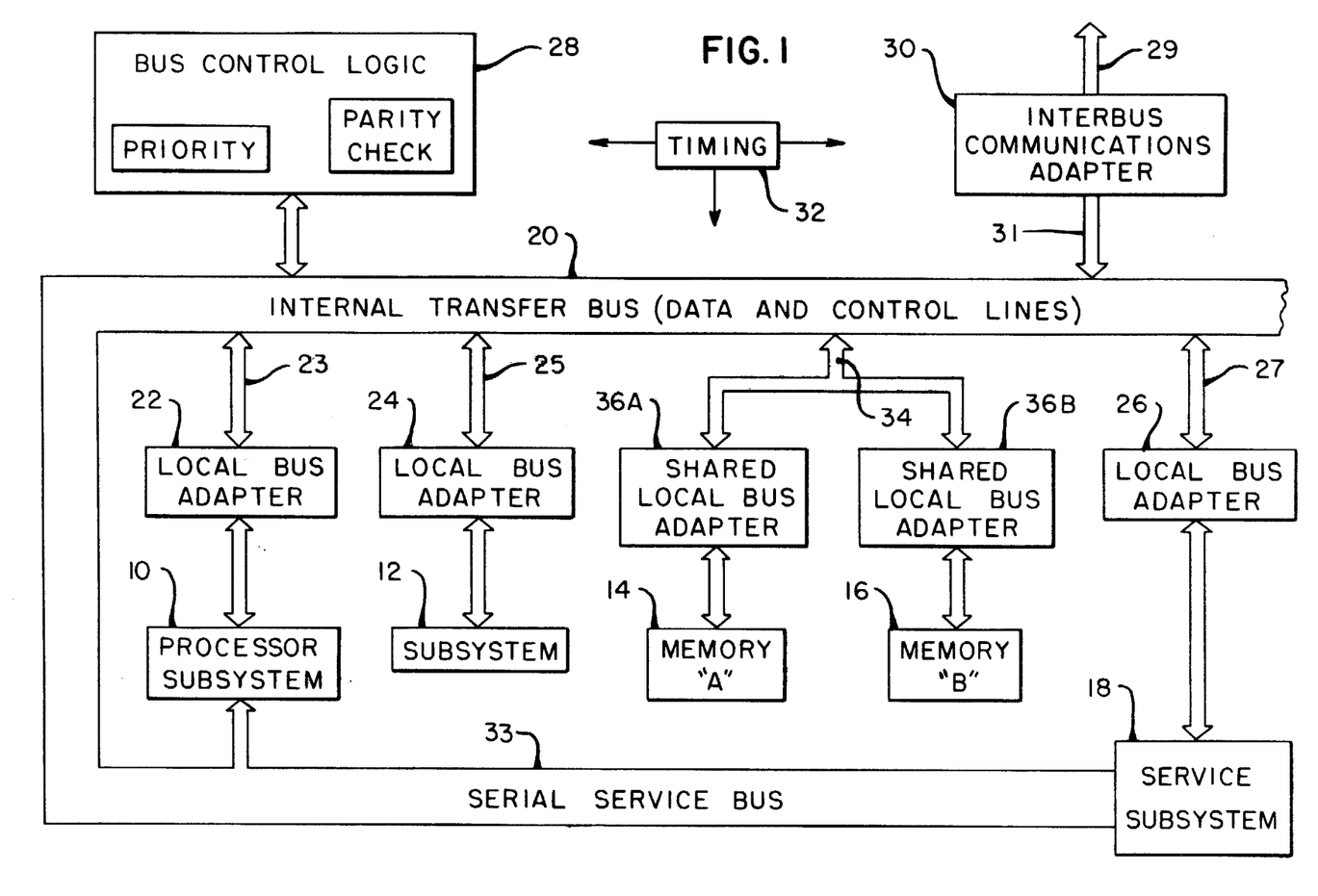
FIG. 1 is a block diagram of a bus oriented data processing system of the type more particularly described in the above-identified co-pending application, Ser. No. 633,345, as modified according to the present invention to include a shared busy line.

Illustrated in FIG. 1 is a broad block diagram of an exemplary data processing system employing principles of the present invention. The illustrated system is the same as that described in the above-identified co-pending application, but modified to include a pair of data processing subsystems at a single port on the bus, which subsystems are coupled to the bus by a pair of shared local bus adapters. Obviously several or even all, of the bus ports may be connected to plural subsystems by using a pair of similar shared local bus adapters for each such port, if deemed necessary or desirable. Details of the prior system and its operation are fully described in the above-identified co-pending application and a complete description thereof is not necessary in the present application.

Briefly, the system shown in FIG. 1 comprises a plurality of data handling subsystems including a processor subsystem 10 and additional data handling subsystems 12, 14, 16 (and others, not shown) which may be other processor subsystems, peripheral subsystems, or memory subsystems. Each of the subsystems 10, 12 and a service subsystem 18 are connected to an internal transfer bus 20 by means of local bus adapters 22, 24 and 26, respectively, at the respective ports. Each port is unique to a single local bus adapter in the system of the prior application Ser. No. 633,345. Thus ports 23, 25 and 27 are respectively associated with the adapters 22, 24 and 26, and port 31 is associated with interbus communications adapter 30. A serial service bus 33 provides communication among bus control logic 28, the processor subsystem 10 and the service subsystem 18. Bus control logic 28, including priority and parity check logic, is also connected with the internal transfer bus. The several subsystems 10, 12, etc. can communicate with still other subsystems (not shown) coupled to another internal transfer bus (not shown) by means of an interbus cable 29 and the interbus communications adapter 30. System and bus timing is provided by a timing circuit 32 which sends a number of clock pulses to the several subsystems by means of the internal transfer bus so that all bus operations are synchronous, occurring at particular clock times.

The several subsystems may include various types of data processing or data handling subsystems such as core memory, tape units, disc units, printers, video displays, and the like. The system may also include a console for communication between an operator and the system. Information is transferred between subsystems via the internal transfer bus in the form of messages. The bus also provides information and control for bus operation and for diagnostic purposes. All information is passed over the internal transfer bus sequentially following the common procedure defined by the internal transfer bus protocol. Local bus adapters 22, 24 and 26 (and others not shown) are identical with each other and interconnect each subsystem (other than those sharing a common busy line) to the internal transfer bus. Each local bus adapter performs all of the logic operations necessary to insure that the internal transfer bus discipline is maintained at all times.

The bus includes a number of individual lines, including request lines employed by a local bus adapter to indicate to bus control a desired communication, select lines employed under control of the bus control to indicate the response to a request, clock lines, operational code lines, destination address lines, and data lines. These and other lines may be collectively termed communication lines. Also included in the bus are three bi-directional status lines which are employed to report message status to the source local bus adapter.

The bus also includes a group of busy lines (one for each port) which are employed for two basic functions. The busy line status (whether high or low) is inspected by a source to determine whether the selected destination adapter is busy or available. In addition, the busy line of a selected destination is sequestered, or uniquely appropriated, by a source to indicate to all other ports that the selected destination will be busy and to advise the selected destination of a forthcoming message.

The busy line can be controlled by the source or by the destination. Prior to raising its request line, a local bus adapter will check the intended destination busy line and if it is high, will withhold its request. However, if it determines that the intended destination busy line is low and if it has received a request granted signal from bus control, the source local bus adapter will force the intended destination busy line high. This signals to all of the other adapters that this particular destination adapter has been selected for a message. Thus, from the standpoint of the source adapter, the busy line of a given destination is used (a) to determine availability of the destination and (b) to signal acquisition of the destination. From the standpoint of the destination adapter, its busy line is used to signal to other adapters whether it is busy or available and also to receive a signal signalling the intended acquisition.

According to principles of the present invention, a single port 34 is employed for both of the subsystems 14 and 16 which are connected to the common port 34 by first and second ones of a pair of shared local bus adapters 36A and 36B. The two adapters are connected to each other, as will be more particularly described below, and are precisely identical to each other in a presently preferred embodiment, except for a variation in test logic employed to enable each of the shared adapters to determine whether a message is for it or for the other of its shared pair. The two shared adapters 36A and 36B are connected in parallel to all of the lines on the internal transfer bus and are both connected to the single busy line that is uniquely assigned to port 34. Thus, this busy line may be termed a common busy line for the two shared adapters 36A and 36B.

It will be seen that when each adapter is acting as a source, it does not employ the unique busy line assigned to its own port as a destination busy line, but actually employs the busy line which is the unique busy line of some other port (that selected as the destination). On the other hand, when the port 34 and one of the subsystems 14 and 16 is selected as a destination, the unique busy line commonly assigned to the two subsystems and uniquely assigned to the port 34, is employed to provide information that may be unique to one or the other of the two subsystems. Thus the local bus adapter will operate just as described in the prior co-pending application, Ser. No. 633,345, when such adapter is acting as a source, even though it is one of a pair that shares a common busy line. No change in the adapter logic that is used when the adapter acts as a source is necessary when the system is modified to include a shared busy line. Only the logic involved in the operation of the common port 34 as a destination is modified, as more particularly described below, when one of the subsystems at the shared port is the selected destination.

The operation of each local bus adapter as a source adapter, whether there is only one adapter per port as described in the prior co-pending application or where there is a shared pair for a port, as described below, is the same as described in the prior application.

Figure 2:
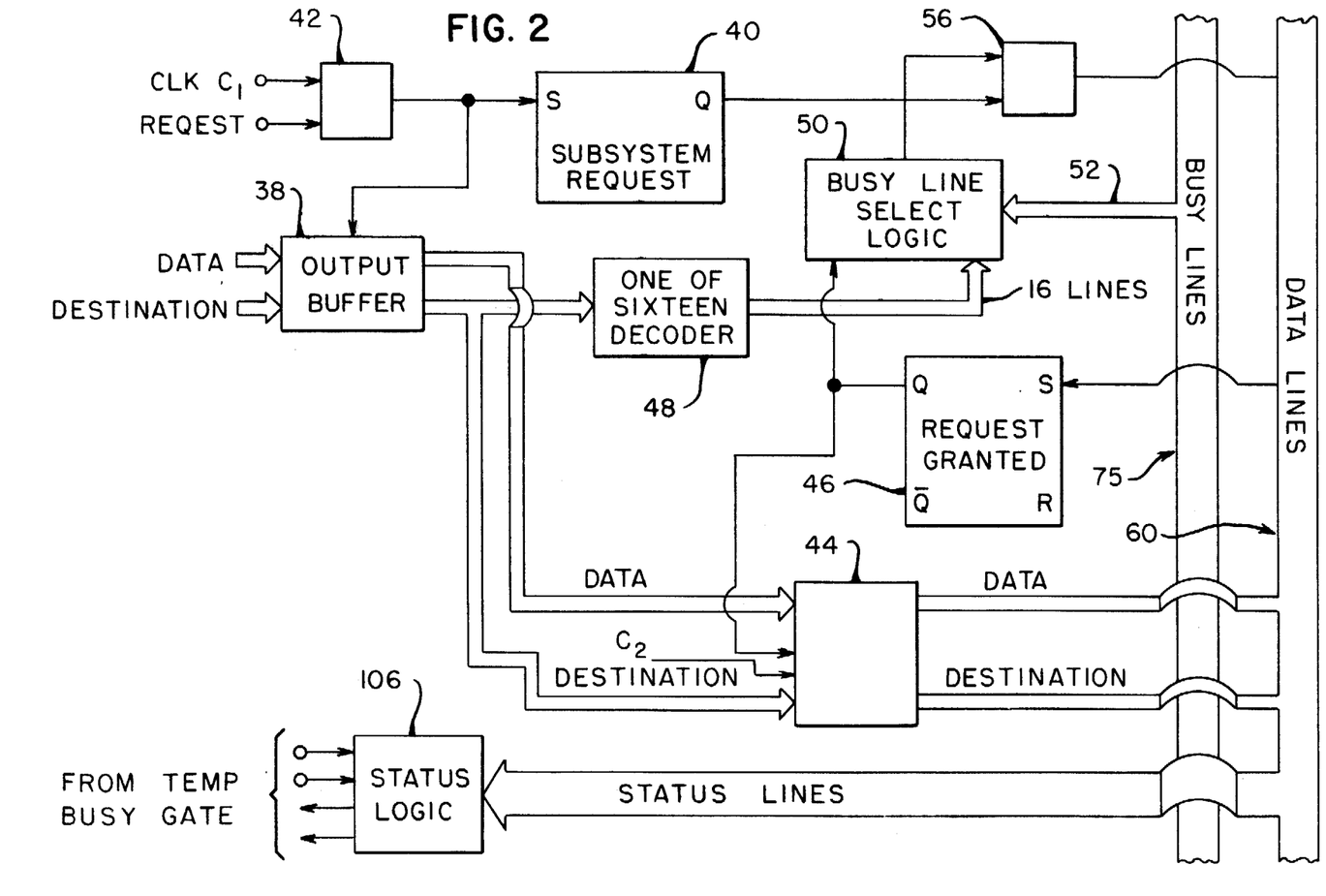
FIG. 2 illustrates portions of logic employed by a local bus adapter when acting as a source.

Portions of a single one of a pair of shared adapters which are used when the adapter operates as a source are shown in FIG. 2. These portions are the same structurally and functionally as corresponding portions described more fully in the above-mentioned application, Ser. No. 633,345. The arrangement shown in FIG. 2 is the same for all shared local bus adapters and a description of this portion of one of a pair of shared adapters will suffice to describe corresponding portions of the other adapter of the same pair.

Communication from the subsystem begins with the subsystem sending data and destination information across the subsystem local bus adapter interface to an adapter output buffer 38, the data being clocked into the buffer when a subsystem request flip-flop 40 is set in accordance with the output of a coincidence gate 42 that receives a system clock $C_1$ (from the bus) and a system request (from the subsystem). The same data and destination information is passed from the output buffer and applied to an output AND gate array 44 which transfers the information therethrough under control of the output of a request granted flip-flop 46.

The destination code from the output buffer 38 is applied to a one of sixteen decoder (for a system having 16 ports) 48 which issues an enabling signal from a single one of its sixteen outputs according to the binary configuration of the input destination code. The sixteen output lines from decoder 48 are applied to busy line selection logic 50 which also receives an input from the output of request granted flip-flop 46. As previously indicated, the busy lines 52 are available for monitoring by the busy line selection logic 50 which includes means for selectively forcing a chosen one of the lines to the busy state.

A request signal received from the subsystem via gate 42 and subsystem request flip-flop 40 is applied to an AND gate 56, which receives a second input from the busy line select logic 50 and thereupon sends out a request signal to the bus control. If the requesting source has proper priority, bus control sends back a request granted signal which sets flip-flop 46.

The described structure and operation of the adapter, in the course of its operation as a source, is the same as that described in the prior application. The busy line selection logic 50 initially monitors the state of the incoming busy lines of 52 and if the busy line uniquely identifying the destination port chosen by the one of sixteen decoder 48 indicates that this port is available, a request for bus is issued via gate 56. If priority exists, the request granted signal is received to set the request granted flip-flop 46 and thus pass the data out from gate 44 to the bus. The busy line select logic forces the selected busy line to its busy state.

This operation, wherein the adapter acts as a source, is described in further detail in the above-identified co-pending application.

As previously described, each of the two shared local bus adapters 36A and 36B is uniquely connected to its own subsystem, and both are connected in common to the single shared busy line at a single port. The sharing of a common busy line by a pair of adapters, as described herein, is effective when one or the other is a destination that has been selected by a source at another port. When an adapter that is not shared is selected as the destination of a bus message, such adapter's busy line will signal, without ambiguity, an available or busy state, of the adapter. In the arrangement described herein, where a pair of local bus adapters shares a common busy line, such a busy line will signal the available state when either one of the adapters of the shared pair is available, even though the other of such pair is busy. Thus, for example, if both adapters of a pair of shared adapters are busy, the common busy line is at logic level one or high, whereas if either one or both of the adapters of the pair is available, the busy line is at logic level zero, or low. Thus with two adapters sharing a common busy line, a source may determine that one or the other, or both, of the adapters of the selected pair is available, but cannot determine, from the shared busy line, which of these three conditions exists. The source cannot determine, from the busy line, whether the selected destination is available when only one is busy.

According to a feature of the present invention, the additional information is provided by shared adapter logic. The source, being informed that one or the other (or both) destination adapters is available, will send its message to the selected destination. The shared adapter logic collectively enables the two shared adapters to cooperatively signal to the source whether or not the selected adapter or the other of the pair is busy.

Thus when a source senses that the common busy line of the selected destination is low, it will force this line high, as described in the above-identified application, Ser. No. 633,345. The destination senses that its busy line has been forced high, thus determining that the message on the bus is for it, and, if it is not busy, it will clock in the data sent from the source. The one or both of the adapters that is available will test the data that is thus clocked in to determine which of the two is the selected destination. Results of the test may be employed to either selectively pass the data to the subsystem of the selected adapter or to uniquely enable such subsystem to act upon the data.

If both destinations are available, the data is clocked into both adapters, but is acted upon only by the selected subsystem (which is uniquely identified by the destination address of the message). The common busy line will remain low, indicating that at least one of the two systems at this port is available.

If one adapter of a shared pair is busy, but the other is available and the message is for the busy adapter, the latter will not clock in the data. The available adapter does so, and tests the message. It determines that the message is not for it, also determines that the other adapter was busy when the message was received, and thereupon signals to the source, via a coded status signal on the existing status lines of the bus, that the selected destination adapter is busy for that message. If both adapters are busy for that message, this condition is signalled by the common busy line itself (a high on this line) rather than by any coded status signal.

Figure 3:
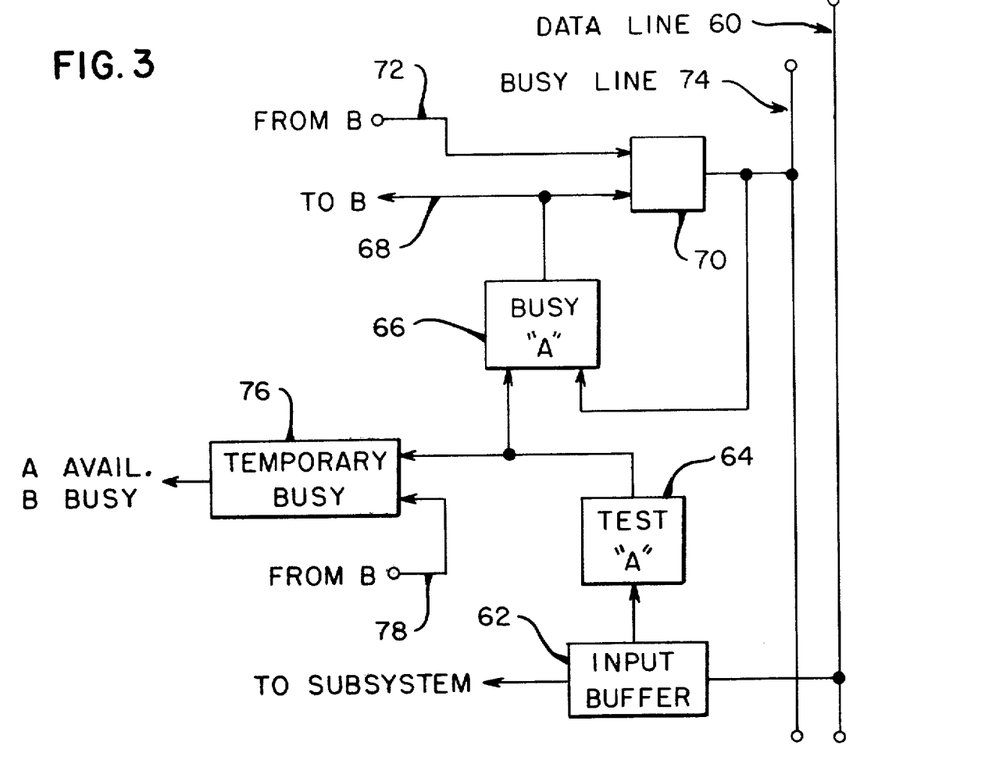
FIG. 3 is a simplified functional diagram of the operation of one of a pair of shared local bus adapters, acting as a destination.

Illustrated in FIG. 3 is a functional diagram of the operation of a single one of a pair of shared local bus adapters. Assume that the adapters of a pair are designated as adapter A and adapter B. The message on data lines generally indicated at 60 is fed to the input buffer 62 of adapter A and thence to test logic 64 of adapter A which feeds the signal to an adapter A busy indicator 66. The latter is placed in its busy state if the message is recognized as directed to adapter A and will remain in this busy state unit it is released by the associated subsystem. The busy indication of indicator 66 is fed via a line 68 to adapter B and also to a coincidence gate 70 which receives as a second input the output of the corresponding busy indicator (not shown in FIG. 2) on a line 72 from the corresponding busy indicator of adapter B. Thus, if the busy indicators of both A and B are set, indicating that both adapters are busy, gate 70 provides an output to the common busy line 74 to hold this line high and thus signal to all other ports that both adapters on this port are busy.

If adapter B is busy and adapter A is available, and a message comes in for adapter B, adapter A receives and tests the message, providing a first output to a temporary busy indicator 76 that the message is not for adapter A, and therefore that the message is for adapter B. It will be noted that the message is clocked in only if the common busy line has been forced high by the source. A second input to the temporary busy indicator 76 is provided from the busy indicator of adapter B on line 78. Thus an output from temporary busy indicator 76 will provide an indication of the concurrent existence of three conditions as follows: (1) adapter A is available, (2) adapter B is busy, and (3) the message is for adapter B. Thus it will be seen that the common busy line is employed to signal to other subsystems on the bus a busy or available state of both of the shared local bus adapters and that the logic of the two adapters conjointly responds to a signal addressed to one of the adapters to signal to other subsystems on the bus a busy state of the destination subsystem concurrent with an available state of the subsystem that shares the busy line of the destination.

The other adapter of a shared pair operates in exactly the same manner, differing only in that its test logic is wired or programmed to respond to a different address, as will be more particularly described hereinafter.

Figure 4A:
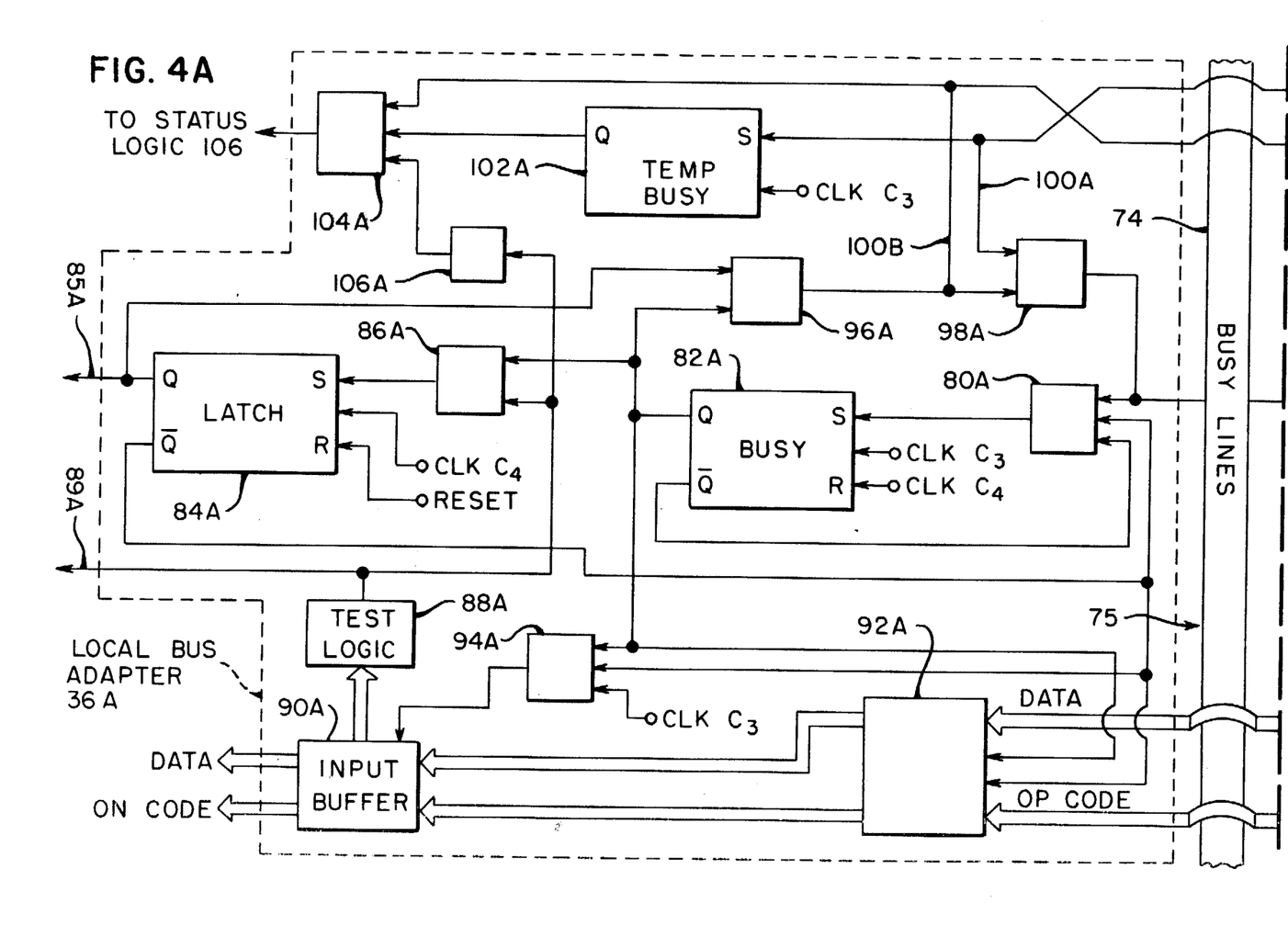
Figure 4B:
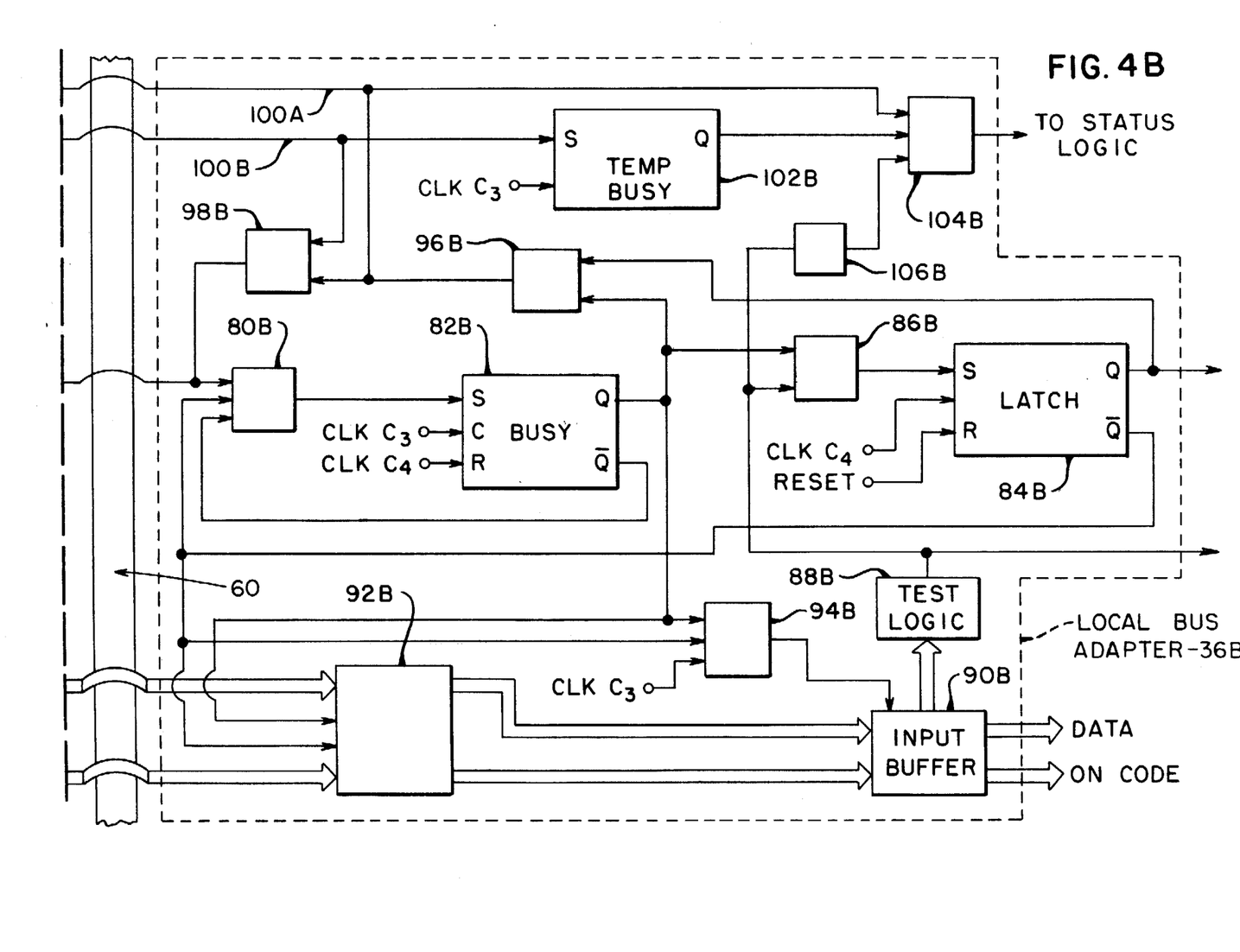

A simplified schematic of logic of the adapters 36A and 36B of a shared pair is shown in FIG. 4. Corresponding elements of the two adapters are designated by the same reference numerals with the suffix "A" added to the several reference numerals for adapter A and the suffix "B" added for adapter B.

The system provides successive clock pulses of which a group of successive pulses $C_1$, $C_2$, $C_3$ and $C_4$ are employed for a single complete communication from raising a request through accepting the data for operation. The request is raised by the source at clock $C_1$. At clock $C_2$ the indication of request granted is received, the source puts out its message on the data lines and thereupon raises the destination busy line to its busy state. At clock $C_3$ the data is clocked into the destination adapter and at clock $C_4$ the latch of the busy adapter is clocked to be set if the message is determined to be for the subsystem associated with such busy indicator latch. The adapter busy latch is reset upon receipt of a signal from the associated subsystem, indicating that the message has been received and accepted. This is basically the same sequencing shown in the above-identified application, Ser. No. 633,345, with an additional clock time, not needed for an understanding of the operation of the system of the prior application, employed herein.

The shared busy line 74 (one of the group of busy lines collectively indicated at 75) provides a first input to an AND gate 80A having a second input from the Q output of a busy flip-flop 82A and a third input from the Q output of a latch flip-flop 84A, the flip-flops forming the adapter busy indicator. The output of gate 80A is fed to the set input of flip-flop 82A which is toggled by clock $C_3$ and has a reset input from clock $C_4$. The Q output of flip-flop 82A is fed as one input to an AND gate 86A having a second input from a test logic circuit 88A. The output of AND gate 86A provides a set input to flip-flop 84A which has a reset input from the associated subsystem and is toggled by the clock $C_4$.

The test logic circuit receives message data, including the destination address code from adapter input buffer 90A. The message on the bus data lines 60 is fed to the input buffer via a coincidence gate 92A, having Data and OP code inputs together with enabling inputs from the Q output of busy flip-flop 82A and the Q output of latch flip-flop 84A. The message is clocked into the input buffer under control of the output of a coincidence gate 94A enabled from the Q and Q outputs of flip-flops 82A, 84A and the clock $C_3$. From the input buffer the Data and Op code are fed to the associated subsystem which is enabled to act on the data in response to a signal from the test logic output, on line 89A or from the Q output of the latch flip-flop 84A on line 85A.

The Q outputs of both flip-flops 82A and 84A are fed via an OR gate 96A to provide a first input to a coincidence gate 98A of which the output is connected to the common busy line 74. The second input to AND gate 98A is provided via a line 100A interconnecting the two adapters of a pair.

Line 100A is connected to the output of OR gate 96B of adapter 36B. Line 100A also provides an input to a temporary busy flip-flop 102A which responds to this input upon occurrence of a clock input $C_3$. The Q output of flip-flop 102A provides a first input to a temporary busy gate 104A having a second input from an inverter 106A which receives the output of the test logic circuit 88A. A third input to temporary busy gate 104A is provided from the output of OR gate 96A.

Each of gates 104A and 104B provide one of several inputs to the status logic circuit 106 (FIG. 2). Details of the status logic are not necessary for understanding of the present invention. The status logic circuit actually provides one or more coded communication lines connected to the source subsystems to indicate, via a coded combination of high and low lines, the temporary busy state of a selected destination. In a preferred embodiment, the output lines of each of gates 104A and 104B (and also a number of other lines, not shown) are coded upon a group of three status lines which, being connected to the several subsystems, convey status information concerning the message. If desired, the status lines could be separate lines directly connecting the outputs of respective temporary busy gates to subsystems at other ports.

The circuit of adapter 36B is the same as that of adapter 36A and is interconnected with the latter in a manner similar to that described above so that a truly symmetrical dual local bus adapter is provided.

Figure 5:
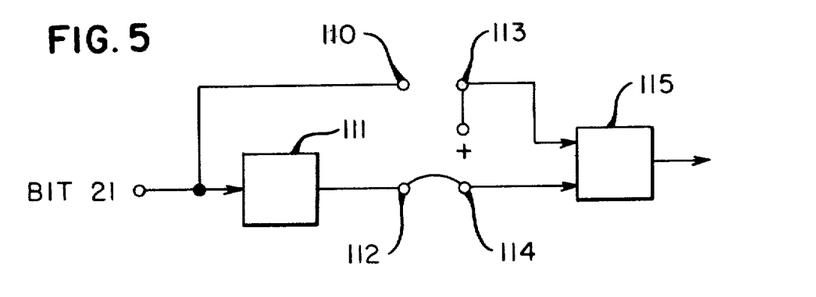
FIGS. 5 and 6 illustrate exemplary test logic for the system shown in FIGS. 4a and 4b.

Test logic 88 may take any one of a number of forms well known to those skilled in the art and may be either permanently wired or under a mode control for selectively identifying one or the other of the two addresses for the adapters at the given port. Thus, for example, referring to FIG. 5 which shows the test logic for adapter 36A, assume that bit number 21 of a message is the bit that is chosen to distinguish between a message for adapter A and a message for adapter B of a pair of shared adapters. Bit 21 is fed to a first terminal 110 and, via an inverter 111, to a second terminal 112. Terminal 110 for the test logic of adapter A is not connected to a terminal 113 which is connected to a high or logical one whereas terminal 112 is connected by a jumper to terminal 114. Terminals 113 and 114 provide the inputs to a coincidence gate 115. Thus, if bit 21 is low, a high input is fed from inverter 111 as a first input to the AND gate, the other input of which is always high and thus a high output is provided from the logic circuit to indicate that the message is for adapter A, in this example.

Figure 6:
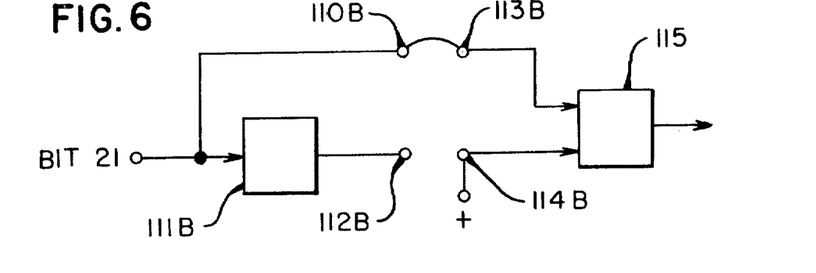

Illustrated in FIG. 6 is the test logic circuit for the other adapter, adapter B of a pair. This logic uses precisely the same hardware as is used for test logic of adapter A, but in this case the terminals 110B, 112B, 113B and 114B are differently connected. Terminals 110B and 113B are connected by a jumper whereas terminal 114B is not connected to terminal 112B, but is connected to a high voltage level. Thus a high signal on bit 21 coming into inverter 111B of the test logic of adapter B, is fed directly to the coincidence gate 115B which has a fixed high at its second input to thus signal for this adapter that a message identified by a high at bit 21 thereof is for the subsystem associated with the local bus adapter B of the shared pair.

Assume both adapters 36A and 36B of FIG. 4 are available. Common busy line 74 is low. At clock $C_1$ the source will raise a request to bus control which is answered at the next clock $C_2$. If the request is granted, a message cycle is initiated at clock $C_2$, and the source will act to force the selected destination busy line high. The source thereby temporarily acquires exclusive access to the selected destination and starts its message cycle, during which the message is placed upon the data lines of the bus. At the next clock, the source will release its forcing of the destination busy line.

With both of the subsystems at the destination port available, the same conditions and operations occur in both adapters except that only that one of the two which is coupled with the selected subsystem will provide a high output from its test logic. Both of the busy and latch flip-flops 82 and 84 initially are in reset condition, providing two high inputs to gates 80 which thus provide a high output to the busy flip-flops 82 when the common busy line 74 is forced high by the source. Flip-flops 82 in both of the shared adapters thus are set upon the occurrence of clock $C_3$ and provide a first output to AND gates 86.

Upon the occurrence of clock $C_3$ and the setting of flip-flops 82, data gates 92 are enabled because these gates detect that the respective adapters are not busy (the latch flip-flops are reset) and their busy lines have been forced high (the busy flip-flops 82 are set). The input buffers 90 are similarly enabled to clock in the data from the bus data lines. The input data of the buffer is passed to both subsystems whether the message is for one or the other. The response of the subsystem to the input data is enabled either by a high output on line 89A or 89B or a high Q output from the latch flip-flop 84A or 84B on lines 85A or 85B from that one of the test logic circuits 88A, 88B which identifies its own address in the message.

Clock $C_3$ initiates the status cycle, during which the destination adapters report back to the source, via the status lines of the bus, various conditions as described in the above-identified application Ser. No. 633,345. In addition, a temporary busy signal is placed on the status lines via one of the temporary busy gates 104, if indeed such a temporary busy condition (one and only one of the shared adapters is busy) exists.

Upon occurrence of clock $C_3$, flip-flops 82 are set to provide a first input via OR gates 96 to AND gates 98. Flip-flops 82 provide, via OR gates 96 and lines 100, a second input to the AND gates 98 of the other adapters. The latter thereupon force the busy line 74 high. It may be noted that after the initiation of clock $C_3$, the source relinquishes its forcing of the destination busy and thus gates 98 force the busy line 74 high during the ensuing status cycle which begins with the occurrence of clock $C_3$. Flip-flops 82 are set at clock $C_3$ and remain set until clock $C_4$.

The output of OR gate 96A is fed as a first input to the temporary busy gate 104A and also as an input to the temporary busy flip-flop 102B of the other adapter. However, flip-flop 102B is responsive only to the leading edge of the clock $C_3$ and thus receives the clock before its input goes high in response to the setting of flip-flop 82A and the passage of the signal through OR gate 96A. Thus neither of the temporary busy flip-flops 102A or 102B is set at clock $C_3$ in this assumed situation (neither adapter is busy upon receipt of the message). With both flip-flops 102A and 102B rest, temporary busy gates 104A and 104B remain inhibited and their outputs are low. The absence of a temporary busy signal indicates to the source that the selected destination subsystem was available when the message was sent.

Assuming the message is for adapter 36A test logic 88A compares the address of the data in input buffer 90A and provides an enabling input to AND gate 86A which has its second enabling input from the Q output of flip-flop 82A. The high output of gate 86A conditions latch flip-flop 84A to be set by the next clock. Upon occurrence of the next clock, $C_4$, the latch flip-flop is set and adapter 36A will remain in this condition until a reset signal is applied to the latch flip-flop. The reset signal is provided by the adapter's subsystem which provides a data accepted signal to indicate that it has accepted and completed its receipt of the incoming message.

The high output of the test logic circuit 88A is also fed via inverter 106A as a low input to temporary busy gate 104A to inhibit the latter when the message is determined to be for adapter 36A. If the message is not for adapter 36A, as determined by the test logic 88A, the input to the temporary busy gate 104A from inverter 36A is high.

Assume now that only one of the adapters is busy when the source puts its message on the data lines, and that the message is for the available one of the two adapters of a pair. In such case the message will be received and acted upon and the common busy line will be forced true when both of the adapters of a pair become busy. Thus, assuming adapter 36A is busy and adapter 36B is available, latch flip-flop 84A is set. The output of OR gate 96A is high and the input from this gate to temporary busy flip-flop 102B is high. Upon occurrence of clock $C_3$, the data is clocked into the input buffer 90B and into test logic circuit 88B of adapter 36B. Test logic circuit 88B will provide a high output since it is assumed that the message is for adapter 36B. Neither of the temporary busy gates 104A and 104B is fully enabled at first because, with regard to gate 104A, flip-flop 102A has not received a high from the latch 84B which had not yet been set and, with regard to gate 104B, test logic 88B provides a high output that inhibits the temporary busy gate 104B, test logic 88B provides a high output that inhibits the temporary busy gate 104B via inverter 106B.

Upon occurrence of clock $C_4$, latch flip-flop 84B is set and the common busy line 74 is now forced high by the two latch flip-flops 84A and 84B, which remain in this condition until one or the other, or both, are reset upon a data accepted reset signal from the connected subsystems. Gate 98A is enabled from flip-flop 84V via OR gate 96A and from flip-flop 84B via OR gate 96B and line 100A. Similarly, gate 98B is enabled from flip-flop 84B via OR gate 96B and also from flip-flop 84A via OR gate 96A and line 100B, to keep the common busy line high.

If, however, adapter 36A is busy, adapter 36B is available, and the incoming message is for adapter 36A, the source cannot determine this from the common busy line and will put its message out on the data lines. Therefore the source must be signalled that its message cannot be accepted. The common busy line is low because only one of the shared adapters is busy, but the source cannot determine, from the shared busy line, that its selected destination is not available. This signalling of temporary busy is achieved via a status signal provided from the output of the appropriate one of the temporary busy gates 104A and 104B. If adapter 36A is busy and adapter 36B is available, but the message is for adapter 36A, then gate 104B of adapter 36B will signal temporary busy. Conversely, if adapter 36B is busy and adapter 36A is available, but the message is for adapter 36B, the gate 104A of adapter 36A will signal temporary busy.

Assume that adapter 36A is busy, adapter 36B is available, and the message is for adapter 36A. Test logic circuit 88B determines that the message is not for adapter 36B and thus provides a first enabling signal to gate 104B. Since adapter 36A is busy, latch 84A provides a high output via OR gate 96A and line 100B to the input of temporary busy flip-flop 102B which will be set upon occurrence of clock $C_3$ to provide a second enabling input to temporary busy gate 104B. The third enabling input (which indicates status cycle) to the three-input coincidence gate 104B is provided from the busy flip-flop 82B via OR gate 96B to thereby provide a high at the output of gate 104B indicating that the message for adapter 36A is not accepted.

Similarly, if adapter 36B is busy and adapter 36A is available when a message comes in for adapter 36B, gate 104A will provide a high output indicating that adapter 36B is busy for that message. As previously described, the temporary busy signal may be transmitted to the source in any desired manner, such as by separate lines on the bus or, as in a preferred embodiment, by means of a three bit code on a group of three status lines within the bus. These status lines are controlled by the output of an encoder (not shown) having a number of separate inputs any combination of which is high at any given time, and each of which will provide a different one of eight status codes on the group of three status lines. However, details of the particular manner in which the temporary busy signal is transmitted back to the source are well within the skill of the art and can be varied without departing from principles of the present invention.

It will be seen that the apparatus described above permits the addition of one or more subsystems to a bus oriented data processing system of the type described without adding additional busy lines and without the difficult and expensive logic and structural changes that would be entailed in adding such additional busy lines. The addition of such a subsystem (sharing a busy line with another) requires no change in any of the system architecture or in any of the other subsystems, other than the ability to address the newly added subsystem. Although the use of two subsystems and a pair of shared local bus adapters all sharing a single port on the internal transfer bus has been disclosed, it will be readily appreciated that principles of the invention can be applied to the sharing of a single port by more than two subsystems. This requires only the use of a single shared local bus adapter for each such subsystem at the common port and requires suitable logical interconnection among all of such shared local bus adapters at the common port in order to signal busy conditions that cannot be signalled via the common busy line. It will be understood that the subsystems that share a common busy line are not required to communicate with each other, but only with subsystems at other ports.

A particular advantage of the shared busy line arrangement described herein is its application to interleaving of subsystems, such as memory units. In memory interleaving, successive words are stored alternately in one memory or another, or, in some schemes, in successive ones of four different memory units, for example. However, for such interleaving schemes to be carried out in the system described in the prior co-pending application, Ser. No. 633,345, each such memory unit which is to participate in an interleaving scheme, must have its own internal transfer bus port and its own local bus adapter. Alternatively a single local bus adapter at a given port can be caused to service two different memory units provided that suitable decision logic and multiplexing is provided at the interface between the adapter and the memory units. Such an arrangement involves undesirably complex timing and logic. If, however, each local bus adapter is made one of a shared pair of local bus adapters, and each of two ports has a pair of memory units and a shared pair of local bus adapters, the interleaving is simplified. Interleaving between the two ports is achieved on the bus and interleaving between the two memory units coupled to a single port via the shared pair of adapters is achieved by the adapters themselves. Thus, for example, memory units 14 and 16 of FIG. 1 may be interleaved with each other and with a second pair of such memory units, each such second pair being connected to another port on the bus (not shown) via a respective one of a second pair of shared local bus adapters (not shown). Exemplary interleaving sequencing would provide for storage of a first word in memory 14 via port 34 and a second word in memory 16 via the same port 34, a third word in a third memory and a fourth word in a fourth memory, both by a single port common to such third and fourth memories. A sequence of first, second, third and fourth memories is repeated for each successive group of four successive words in this example. In such an arrangement it is necessary to connect each shared local bus adapter only to a single memory so that no multiplexing between adapter and memory is needed and, further, the complex timing required for a single adapter to communicate with plural memories is avoided.

Although memory interleaving is a significant application of the described shared busy line, it will be readily appreciated that the present invention is applicable to provide a pair of data handling systems of any type sharing a common busy line and interconnected therewith by shared local bus adapters, whether or not such paired subsystems are related to one another in any common operative scheme such as interleaving or a redundant backup operation, or whether such paired subsystems are completely independent of one another. For example, to provide a backup interconnection between a pair of internal transfer buses of a system, a pair of inter-bus communication cables, each the same as that shown in FIG. 1, can be connected to a common port on one bus (or to common ports on both buses) by means of a pair of shared local bus adapters of the type described herein. If one such cable should fail, only a single address bit need be changed to employ the other inter-bus communication cable and maintain the system in operation. For use with redundant systems, the shared adapter logic has no interconnection between the two adapters since each of such a redundant pair of subsystems operates the same as the other at all times. However, the use of the two adapters sharing a common busy line is preferred to allow certain checks to be carried out, such as verification of adapter operation, for example.

The foregoing detailed description is to be clearly understood as given by way of illustration and example only, the spirit and scope of this invention being limited solely by the appended claims.

What is claimed is:

1. In a data processing system wherein each of a group of data handling subsystems communicates with other subsystems of the group by means of an internal transfer bus having a number of bus ports connected to the subsystems by local bus adapters, and wherein each bus port has a single busy line uniquely assigned thereto for signalling busy or available states of the adapter at such bus port to other adapters at other bus ports, and for signalling an incoming message from one of the other adapters to the adapter at such bus port, the improvement comprising:

first and second shared local bus adapter means for respectively connecting first and second ones of said subsystems in common to one of said ports, the single busy line of such port being a common busy line connected and assigned to both said shared adapter means for signalling states thereof, said shared adapter means including, means for employing said common busy line to signal to other subsystems on said bus a busy state of both of said first and second subsystems, and means responsive to a signal addressed to said first subsystem for signalling to other subsystems on said bus a busy state of said first subsystem concurrent with an available state of said second subsystem.

2. The system of claim 1 wherein said means for employing said common busy line to signal a busy state of both said subsystems comprises busy indicating means in each said shared adapter means for indicating a busy or available state of the respective adapter means, and means responsive to both said busy indicating means for controlling a signal on said common busy line.

3. The system of claim 1 wherein communications between bus ports include a destination subsystem address, wherein said bus includes at least one status line coupled to subsystems at said bus ports, and wherein said means for signalling a busy state of said first subsystem concurrent with an available state of said second subsystem comprises test means in each said shared adapter means for identifying a received destination subsystem address, busy indicating means in each said shared adapter means for indicating a busy or available state of the respective shared adapter means, and means responsive to at least one of said test means and to at least one of said indicating means for controlling a signal on said status line.

4. The system of claim 3 wherein said means for controlling a signal on said status line comprises a first temporary busy device in said first shared adapter means responsive to the busy indicating means in said second shared adapter means and to the test means in said first shared adapter means for providing a temporary busy signal.

5. A data processing system comprising:
a group of data handling subsystems, each including means for sending and receiving communications, an internal transfer bus having a number of bus ports and including a plurality of communication and busy lines, and at least one status line, a plurality of local bus adapters connected between said bus and different ones of said subsystems at said bus ports, all of said busy lines being connected as source busy lines to the adapters at all of said ports, and each of said busy lines being uniquely connected as a destination busy line to an individual one of said ports to signal to all other ports the busy or available state of the port individual to such destination busy lines, first and second shared adapter means at one of said ports for transferring information between said bus and respective ones of first and second subsystems of said group of subsystems, both said shared adapter means being connected to the destination busy line of said port, said last mentioned busy line being a common busy line for both said shared adapter means, each such shared adapter means comprising test means for identifying an address of a communication received at said one port, busy indicating means for indicating a busy or available state of such shared adapter means, temporary busy indicating means for indicating a busy state of one of the shared adapter means at said one port and a concurrent available state of the other of said shared adapter means at said one port, means responsive to the busy indicating means of both said shared adapter means for controlling said common busy line, and means for actuating said temporary busy means in response to at least one of said test means and at least one of said busy indicating means.

6. The data processing system of claim 5 wherein each said shared local bus adapter means includes an input buffer connected between said communication lines and its associated subsystem and means responsive to both a signal on said common busy line and a state of said busy indicating means representing availability of such shared adapter means for enabling transfer of data into said buffer.

7. The data processing system of claim 5 wherein said busy indicating means of one of said shared adapter means comprises a bi-state busy device having an input from said common busy line and having an output, a first gate having an output from the output of said bi-state busy device, having a second input from said test means, and having an output, a bi-state latch device having an input from said first gate and having an output, a temporary busy gate having a first input from the output of said test means and having a second input from the output of the bi-state latch device of the other of said first and second shared adapter means, said temporary busy gate having an output connected with said status line.

8. The system of claim 7 including a fourth gate having first and second inputs from bi-state latch devices of both of said first and second shared adapter means and having an output connected with said common busy line.

* * * * *